Figure 1:
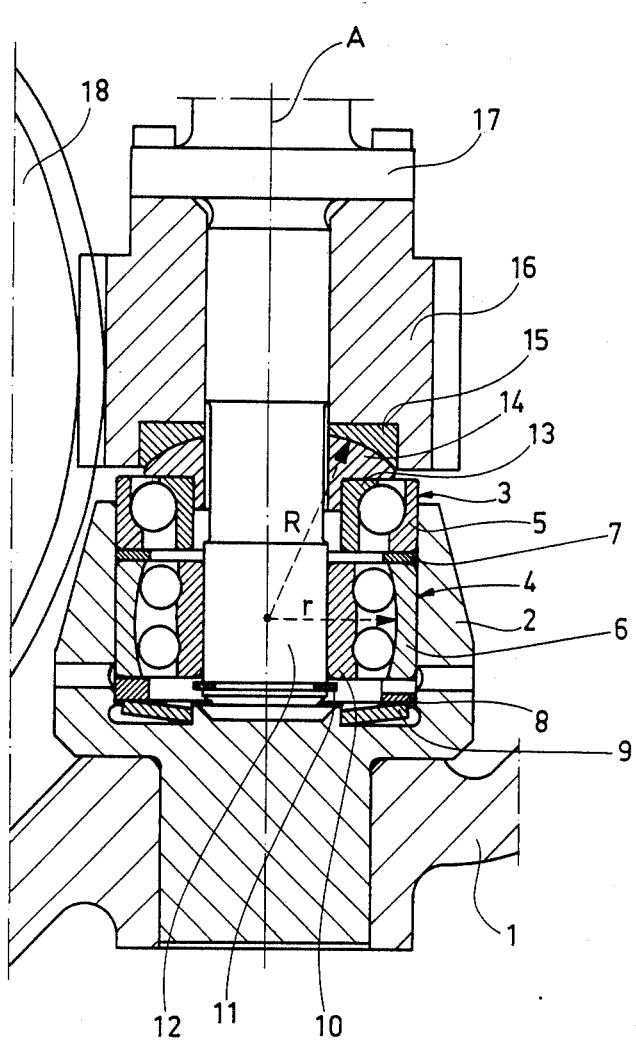

United States Patent [19]

Földhazy et al.

[11] Patent Number: 4,575,263
[45] Date of Patent: Mar. 11, 1986

[54] BEARING DEVICE

[75] Inventors: Zoltan Földhazy, Tumba; Otto Hellekant, Ronninge, both of Sweden

[73] Assignee: Alfa-Laval Separation AB, Tumba, Sweden

[21] Appl. No.: 643,453

[22] Filed: Aug. 23, 1984

[30] Foreign Application Priority Data

Sep. 23, 1983 [SE] Sweden .............................. 8305148

[51] Int. Cl.⁴ .............................................. F16C 21/00
[52] U.S. Cl. .................................... 384/126; 384/453; 384/495
[58] Field of Search ............... 384/123, 497, 453, 495, 384/206, 126

[56] References Cited

U.S. PATENT DOCUMENTS 1,281,245 10/1918 Pruyn ................................. 384/453
1,319,794 10/1919 Pruyn ................................. 384/453
1,373,139 3/1921 Lindman ........................... 384/497

Primary Examiner—Lenard A. Footland
Attorney, Agent, or Firm—Cyrus S. Hapgood

[57] ABSTRACT

A bearing device for a spindle (12), rotatably suspended in a frame (1), comprises a first bearing (4) arranged to transfer radial forces from the spindle to the frame while permitting a certain inclination of the spindle in relation to its intended rotational axis (A), and a second bearing (3) arranged to transfer axial forces from the spindle to the frame. For avoiding mutual inclination of the bearing rings of the axial bearing (3) upon inclination of the spindle during its operation, said axial bearing (3) is arranged to transfer the axial forces through two abutting contact surfaces movable relative to each other, one of which is united with the rotatable bearing ring (13) of the axial bearing, and the other of which is united with the spindle (12).

10 Claims, 2 Drawing Figures

BEARING DEVICE

The present invention relates to a bearing device for a spindle, preferably a vertically arranged spindle, that is rotatably suspended in a frame, the device comprising a first bearing arranged to transfer radial forces from the spindle to the frame while permitting a certain inclination of the spindle in relation to its intended rotational axis, and a second bearing arranged to transfer axial forces from the spindle to the frame. The second bearing is arranged by means of one of the bearing rings to transfer the axial forces via two abutting contact surfaces which are movable relative to each other, so that said inclination of the spindle is possible during rotation of the spindle.

A bearing device of this kind is disclosed in German Pat. No. 651,907. In this previously known bearing device, the two autting contact surfaces are formed in the frame and in the non-rotatable (lower) bearing ring of the bearing transferring axial forces. The whole bearing transferring axial forces, i.e. the (upper) bearing ring rotating with the spindle as well as the non-rotating (lower) bearing ring, is thus arranged to accompany the inclination of the rotating spindle in relation to the rotational axis.

By this known arrangement, an inclination of the spindle has the result that the contact surface formed in the axial bearing always performs a movement in relation to the contact surface formed in the frame during rotation of the spindle—and this in spite of the fact that none of the contact surfaces rotate around the rotational axis of the spindle.

Even if the friction to some extent can be kept down between said contact surfaces, the known arrangement means that the axial bearing is subjected to undesirable forces during rotation of the spindle, which forces tend to incline the two bearing rings relative to each other. This causes undesired load, vibration and wear of the axial bearing.

The principal object of the present invention is to avoid the axial bearing being subjected to undesired forces of the kind just described, when the spindle is rotating while inclined in relation to its rotational axis.

According to the invention, this object may be fulfilled by having the two contact surfaces formed in members united with the spindle and with the rotatable bearing ring of the bearing transferring the axial forces, respectively. Said contact surfaces are thus rotatable together with the spindle.

By this invention, when the spindle inclines at a certain angle relative to the intended rotational axis of the spindle, the contact surface united with the spindle will take a certain position in relation to the contact surface united with the axial bearing, which mutual positions do not change as a consequence of rotation of the spindle. As long as the spindle rotates with a certain inclination relative to its rotational axis, the axial bearing will thus not be subjected to any undesired forces as a consequence of the inclination itself. Only with changes of the magnitide of the inclination will such forces arise.

According to a preferred embodiment of the invention, said first bearing (i.e. the bearing transferring radial forces) is a so-called spherical bearing, and the two contact surfaces are part-spherical, said contact surfaces being arranged so that their common geometrical center coincides with the possible turning center of the spindle in the spherical bearing.

Figure 2:
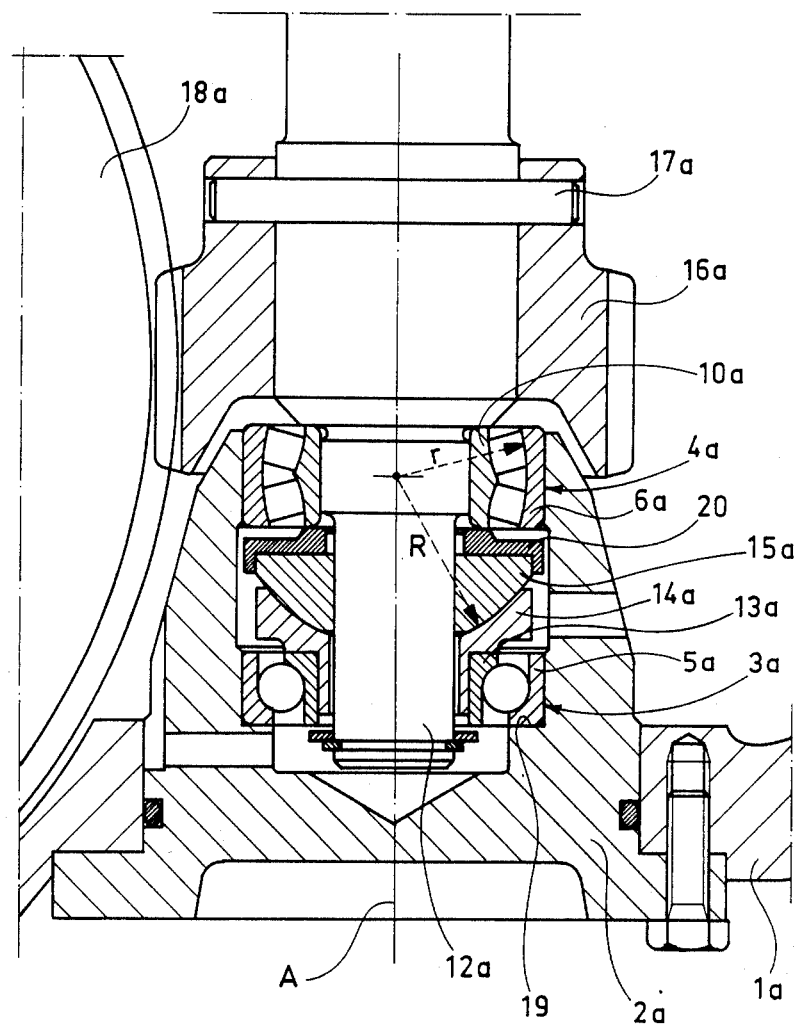

The invention will now be described in more detail below with reference to the accompanying drawings, in which FIGS. 1 and 2 are vertical sectional views of a first and a second embodiment, respectively, of the invention.

In FIG. 1, a frame 1 supports a bearing housing 2. Within the bearing housing are two different bearings 3 and 4, respectively, an upper bearing 3 transferring axial forces, and a lower bearing 4 transferring radial forces.

The bearing housing 2 supports the outer bearing rings 5 and 6 of the two bearings 3 and 4, respectively, a spacing washer 7 keeping these bearing rings spaced from each other. The outer bearing ring 6 of the lower bearing is supported by the bearing housing 2 via a spacing ring 8 and a spring washer 9, the upper bearing ring 5 resting on the bearing ring 6 via said spacing washer 7.

The lower bearing 4, which is a so-called spherical ball bearing, has an inner bearing ring 10. An annular washer 11 is arranged in a recess in the lower end portion of a spindle 12 extending vertically upwards through the two bearings 3 and 4. The bearing ring 10 is connected with the spindle 12 so that it can rotate therewith, whereas the inner bearing ring 13 of the upper bearing surrounds the spindle 12 with a certain clearance.

The inner ring 13 of the upper bearing 3 supports a member 14 having an upwardly convex, part-spherical surface. Also this member 14 surrounds the spindle 12 with a certain clearance. In contact with said part-spherical surface is a concave surface with the same radius of curvature formed in another member 15, which rests on the member 14. The member 15 is supported by a gear wheel 16, which in turn is firmly connected with the spindle 12 by means of a clutch 17.

The spindle 12 is rotatable around a rotational axis A by means of a worm wheel 18 engaging said gear wheel 16.

The outer bearing ring 6 of the spherical bearing 4 has an inside radius of curvature r with its center at the intended rotational axis A. The two part-spherical contact surfaces of the members 14 and 15 have a radius of curvature R with its center at the same point as that of the radius of curvature r.

During rotation of the gear wheel 16 and the spindle 12, the members 15 and 14 and the inner bearing ring 13 of the upper bearing are entrained in the rotation. Sufficient friction prevails between said members 13–16 to cause such entrainment. Also the inner bearing ring 10 of the lower bearing 4 is entrained in the rotation of the spindle 12, whereas the outer bearing rings 5 and 6 remain held against rotation in the bearing housing 2.

As long as the spindle 12 rotates around the intended rotational axis A, there is no relative motion between the members 14 and 15. However, if the geometrical axis of the spindle in the area of the bearings 3 and 4 moves so that it forms an angle with the intended rotational axis A, the member 15 will be displaced somewhat relative to the member 14 along the spherical contact surfaces of these members. The member 14, which is connected with the inner bearing ring 13 of the upper bearing, will not be influenced by such inclination of the spindle 12. The member 14 as well as the inner bearing ring 13 will thus continue to have coinciding rotational axes and geometrical axes, whereas the geometrical axis of the spindle forms an angle with the rotational axis A. As long as the geometrical axis of the spindle maintains one and the same angle relative to the rotational axis A, there will be no relative movement between the members 14 and 15 during the rotation thereof.

In FIG. 2, there is shown an alternative embodiment of the bearing device according to the invention. Details in FIG. 2 having counterparts in FIG. 1 have been given the same reference numerals as in FIG. 1 with the addition a.

The device in FIG. 2 differs from that in FIG. 1 in that the members 14a and 15a, which are provided with the part-spherical contact surfaces, are situated between the two bearings 3a and 4a, and in that the spherical bearing 4a transferring radial forces is arranged above the bearing 3a transferring axial forces.

As in FIG. 1, the member 14a in FIG. 2 is connected with the inner bearing ring 13a of the bearing 3a, whereas the member 15a is connected directly with the spindle 12a instead of through the gear wheel 16 mounted on the spindle, as in FIG. 1. Within the bearing housing 2a, the outer bearing ring 5a of the lower bearing rests on a housing shoulder 19, while the member 14a, which through the member 15a supports the spindle 12a, rests on the inner bearing ring 13a of the lower bearing 3a. An annular washer 20 is inserted between the member 15a and the inner bearing ring 10a of the upper bearing 4a, the outer bearing ring 6a of which is supported by the bearing housing 2a.

In FIG. 2, if the geometrical axis of the spindle 12a forms an angle with the rotational axis A, which is allowed by the spherical bearing 4a, not only the inner bearing ring 10a of the bearing 4a but also the washer 20 and the member 15a will take the same angular position as the spindle. A radial displacement will thus arise between the members 15a and 14a, which are both rotating together with the spindle 12a. Neither the member 14a nor the inner ring 13a of the lower bearing 3a is thus influenced by an inclination of the spindle 12a. Each of these members at such an inclination will thus have a common rotational axis A and geometrical axis.

As in the device in FIG. 1, no relative movement will occur between the members 14a and 15a during the rotation thereof as long as the geometrical axis of the spindle 12a maintains one and the same angle in relation to the rotational axis A.

Common to the bearing devices in FIG. 1 and FIG. 2 is that the members 14, 15 and 14a, 15a, respectively, are arranged so that their part-spherical contact surfaces have a common geometrical center coinciding with the geometrical center of the part-spherical inside surface of the outer bearing ring 6 or 6a, respectively, of the bearings 4 and 4a (i.e., the possible turning center of the spindle 12a in the spherical bearing).

An important feature of the present bearing device is its ability to accommodate axial resiliency and wear of the axial bearing without impairing the radial bearing. In FIG. 1, for example, as the axial bearing 3 begins to wear, its inner ring 13 moves relative to outer ring 5 by descending into the underlying space and toward radial bearing 4, instead of exerting on inner ring 10 of radial bearing 4 an axial force which could soon destroy the radial bearing. Of course, this descent of ring 13 is accompanied by downward sliding of spindle 12 through inner ring 10 and into the underlying space in housing 2. In FIG. 2 as in FIG. 1, wearing of the axial bearing 3a causes its inner ring 13a and the weight supported thereon to descend relative to outer ring 5a. In this case, radial bearing 4a slides downward in housing 2a accompanied by parts 20, 14a-15a and spindle 12a, the lower end of which moves into the underlying space in housing 2a.

Thus, a characterizing feature of the invention is that it includes means spacing the two bearings from each other while allowing relative axial movement between the radial bearing and one ring of the axial bearing in response to axial resilience or wear of the axial bearing. In FIG. 1, the washer 7 forms such spacing means, while in FIG. 2 the spacing means comprise washer 20 in addition to the parts 14a-15a.

We claim:

1. In a bearing device for a spindle rotatably suspended in a frame, said device including a first bearing which comprises one rotatable and one non-rotatable bearing ring and which is arranged to transfer radial forces from the spindle to the frame while permitting inclination of the spindle relative to its normal rotational axis, a second bearing arranged to transfer axial forces from the spindle to the frame and comprising one rotatable and one non-rotatable bearing ring, and two abutting contact surfaces through which said axial forces are transferred to the frame by way of one of the bearing rings of said second bearing, said contact surfaces being movable relative to each other to permit inclination of the spindle relative to said rotation axis during rotation of the spindle, the improvement which comprises a first member united with the spindle and carrying one of said contact surfaces, and a second member carrying the other contact surface and united with the rotatable bearing ring of said second bearing, the bearing device including means spacing said first and second bearings from each other while allowing relative axial movement between said radial bearing and one ring of said axial bearing in response to axial resilience or wear of the axial bearing.

2. The bearing device of claim 1, in which one of the bearing rings of said first bearing is free of axial engagement with said second bearing.

3. The bearing device of claim 1, in which said spacing means form an axial engagement between said non-rotatable bearing rings while spacing from each other said rotatable bearing rings of the respective bearings.

4. The bearing device of claim 3, in which said spacing means are a washer.

5. The bearing device of claim 1, in which said spacing means include said first and second members.

6. The bearing device of claim 1, in which said first bearing is a spherical bearing, said two contact surfaces being partly spherical and having a common geometrical center, said spherical bearing having a spindle-turning center coinciding with said common geometrical center.

7. The bearing device of claim 1, in which said second bearing is located above said first bearing, said first and second members being located above said second bearing.

8. The bearing device of claim 1, in which said second bearing is located below said first bearing, said first and second members being located between said first and second bearings.

9. The bearing device of claim 1, comprising also a gear rotatable with the spindle for driving it, said first member being united with the spindle through said gear.

10. The bearing device of claim 1, in which said first member is directly united with the spindle.

* * * * *